(12) United States Patent
Greening

(10) Patent No.: US 10,309,152 B2
(45) Date of Patent: Jun. 4, 2019

(54) CONTROL ASSEMBLY FOR A ROLLER BLIND

(71) Applicant: Louver-Lite Limited, Hyde (GB)

(72) Inventor: Andrew Greening, Sandbach (GB)

(73) Assignee: Louver Lite Limited, Hyde (GB)

(*) Notice: Subject to any disclaimer, the term of this patent is extended or adjusted under 35 U.S.C. 154(b) by 0 days.

(21) Appl. No.: 14/425,191

(22) PCT Filed: Sep. 2, 2013

(86) PCT No.: PCT/GB2013/052290
§ 371 (c)(1),
(2) Date: Mar. 2, 2015

(87) PCT Pub. No.: WO2014/033474
PCT Pub. Date: Mar. 6, 2014

(65) Prior Publication Data
US 2015/0218882 A1 Aug. 6, 2015

(30) Foreign Application Priority Data
Sep. 3, 2012 (GB) .................................. 1215667.5

(51) Int. Cl.
*E06B 9/42* (2006.01)
*E06B 9/78* (2006.01)
(Continued)

(52) U.S. Cl.
CPC .................. *E06B 9/42* (2013.01); *E06B 9/78* (2013.01); *F16D 41/206* (2013.01); *F16H 7/20* (2013.01); *E06B 2009/785* (2013.01)

(58) Field of Classification Search
CPC ........ E06B 9/42; E06B 9/78; E06B 2009/785; E06B 9/50; E06B 9/44; F16H 57/031
(Continued)

(56) References Cited

U.S. PATENT DOCUMENTS 187,918 A * 2/1877 Sharp ........................ E06B 9/50
160/298
1,379,664 A * 5/1921 Tomasulo .............. A47H 21/00
160/268.1
(Continued)

FOREIGN PATENT DOCUMENTS

GB 2392703 3/2004

OTHER PUBLICATIONS

Written Opinion for PCT/GB2013/052290.

*Primary Examiner* — Katherine W Mitchell
*Assistant Examiner* — Jeremy C Ramsey
(74) *Attorney, Agent, or Firm* — Haugen Law Firm PLLP

(57) ABSTRACT

A control assembly for a roller blind, the assembly including a chain wheel adapted to be driven by an operating chain; a drive bush; and a locking pin, wherein at least one of the chain wheel and drive bush includes a coupling element which in use couples the chain wheel to the drive bush such that axial displacement of the drive bush results in a corresponding axial displacement of the chain wheel, but that relative rotational displacement between the chain wheel and the drive bush is permitted through an arc defined between a pair of opposed stops which are carried by the other of the chain wheel and the drive bush; and wherein the locking pin passes axially through the chain wheel and the drive bush, the locking pin including at one end thereof a pair of opposed legs and at least one leg includes a locking lug adapted to engage a stop surface of the drive bush.

13 Claims, 7 Drawing Sheets

(51) Int. Cl.
*F16D 41/20* (2006.01)
*F16H 7/20* (2006.01)

(58) Field of Classification Search
USPC .............................................. 160/321, 323.1
See application file for complete search history.

(56) References Cited

U.S. PATENT DOCUMENTS

| | | | | |
|---|---|---|---|---|
| 2,569,599 | A * | 10/1951 | Cole | E04F 10/0633 160/133 |
| 5,009,259 | A * | 4/1991 | Miloslaus | E06B 9/50 160/323.1 |
| 8,230,759 | B2 * | 7/2012 | Hsieh | E05D 13/003 160/310 |
| 2003/0085003 | A1 * | 5/2003 | Cheng | E06B 9/42 160/321 |
| 2006/0068962 | A1 * | 3/2006 | Allsopp | E06B 9/42 475/182 |
| 2007/0107857 | A1 * | 5/2007 | Wang | E06B 9/42 160/321 |
| 2007/0246173 | A1 | 10/2007 | Liu | |
| 2010/0276530 | A1 | 11/2010 | Di Stefano | |
| 2013/0190119 | A1 * | 7/2013 | Barnes | E06B 9/42 474/144 |

* cited by examiner

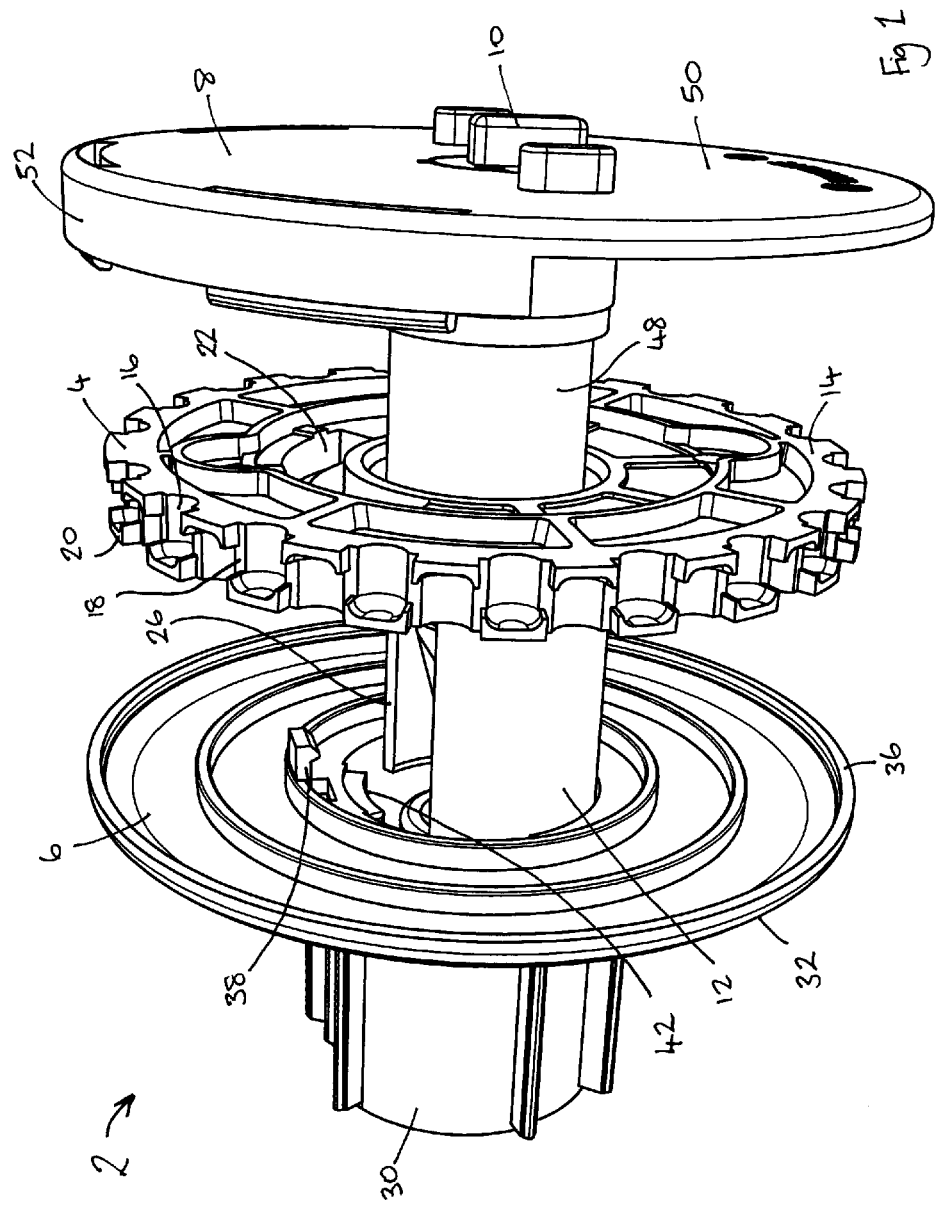

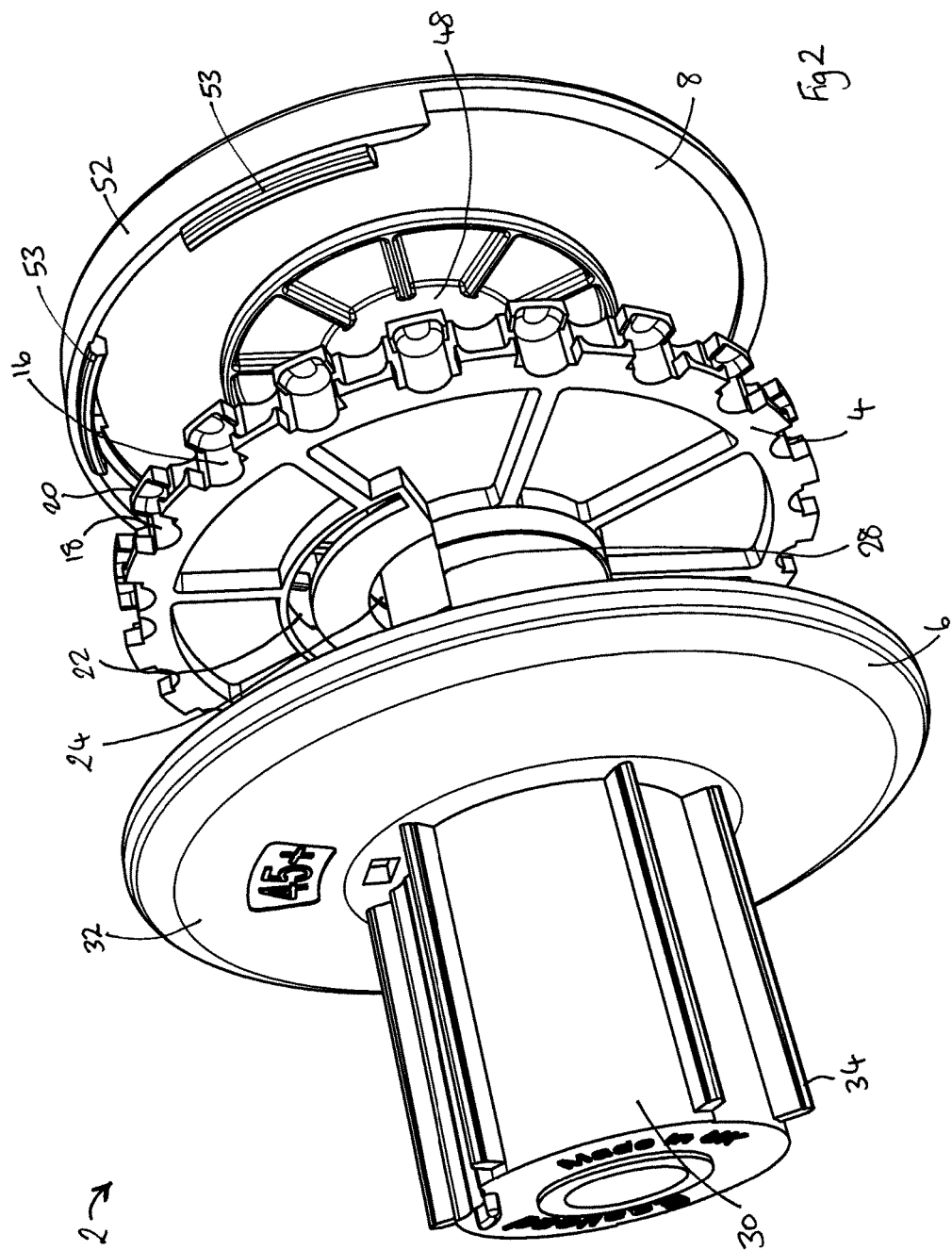

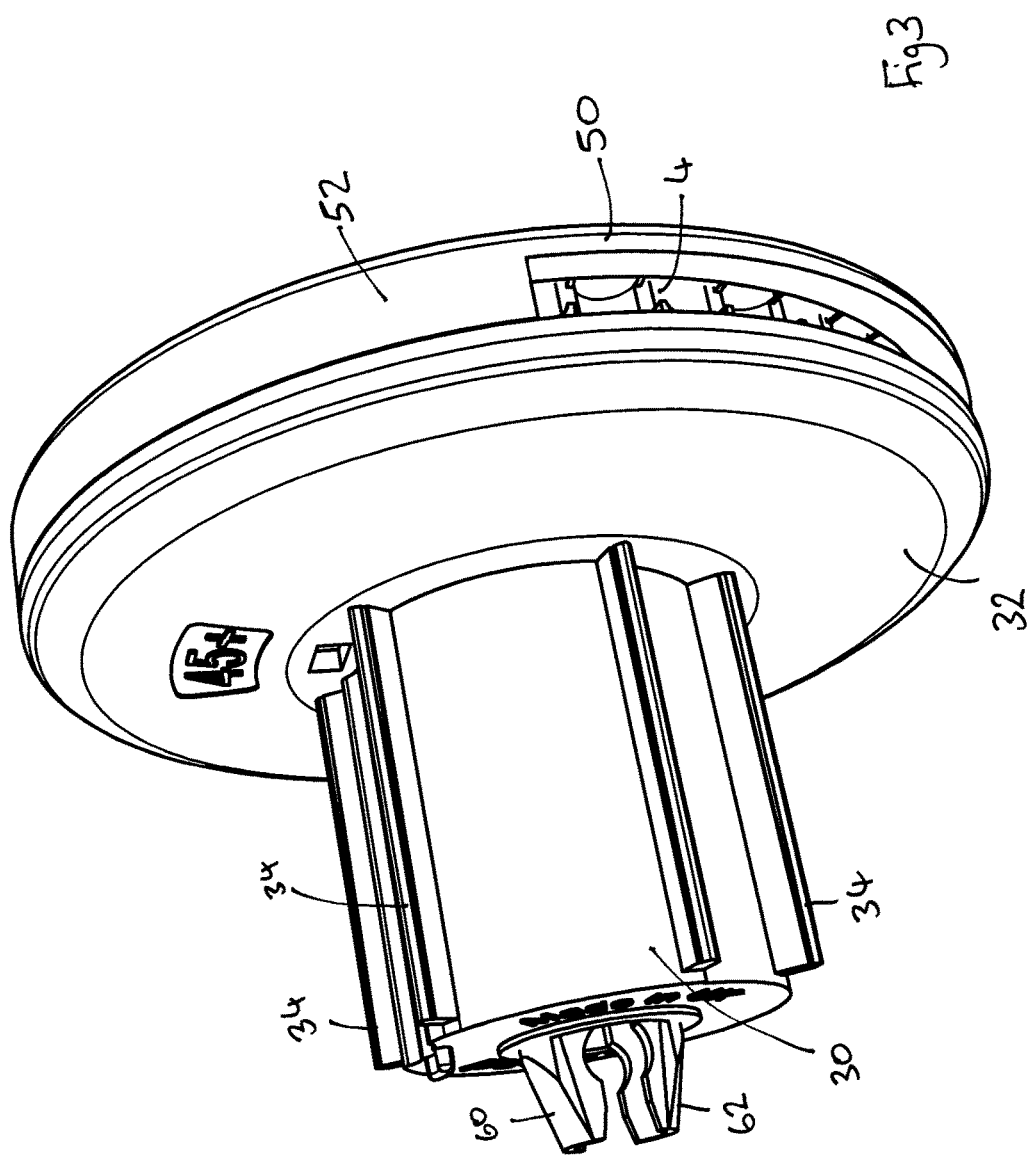

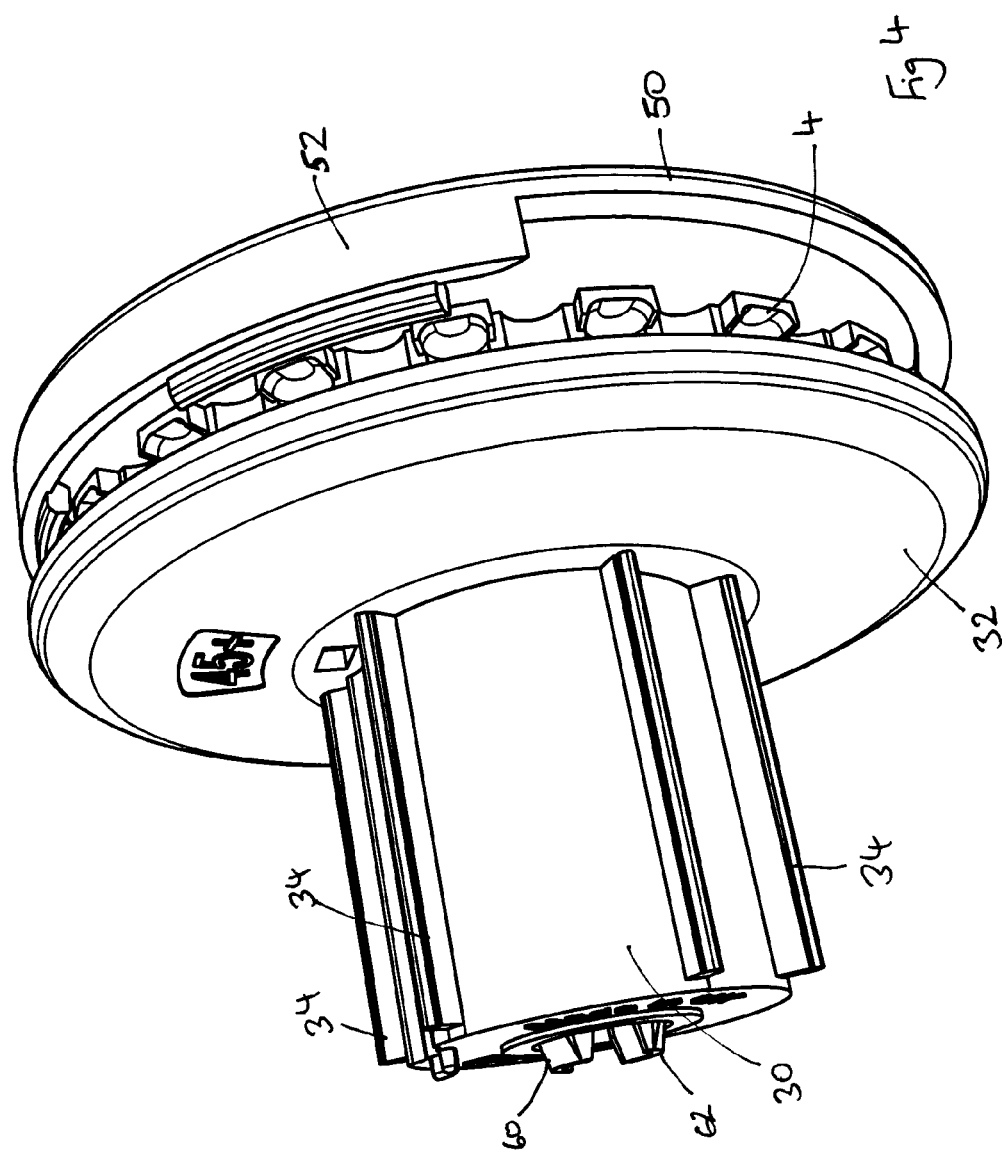

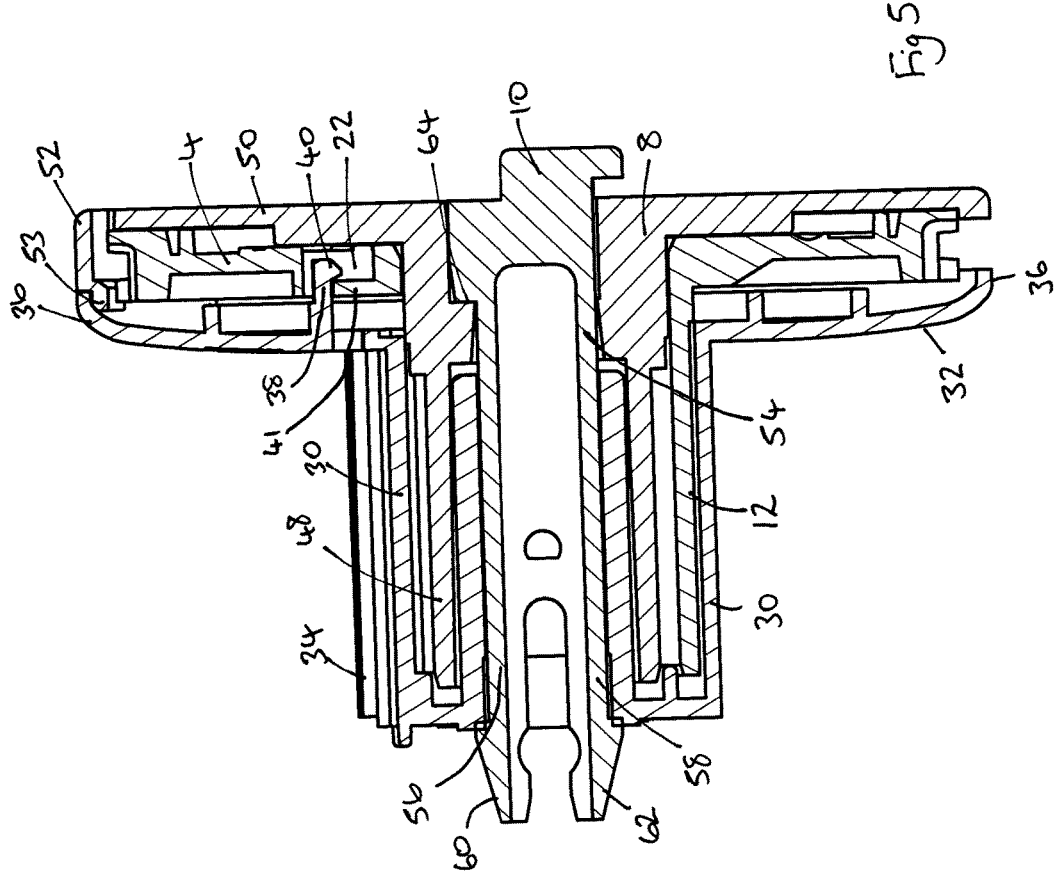

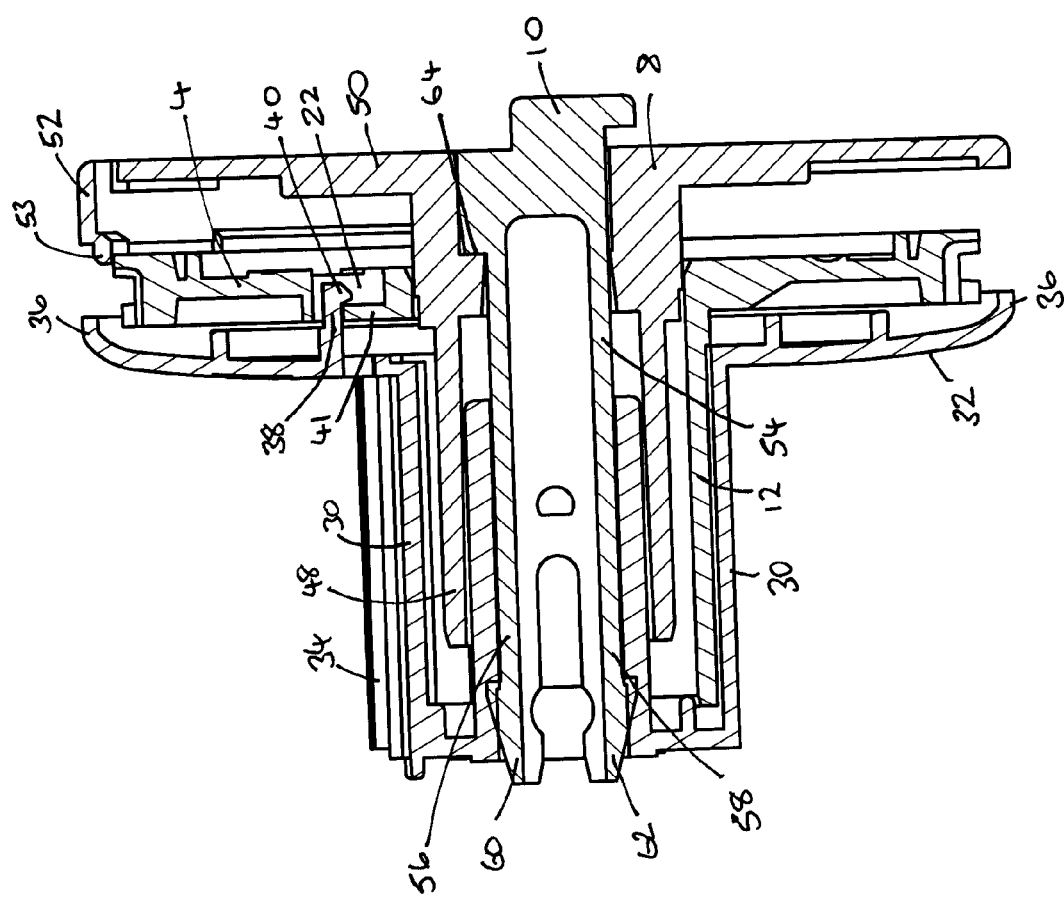

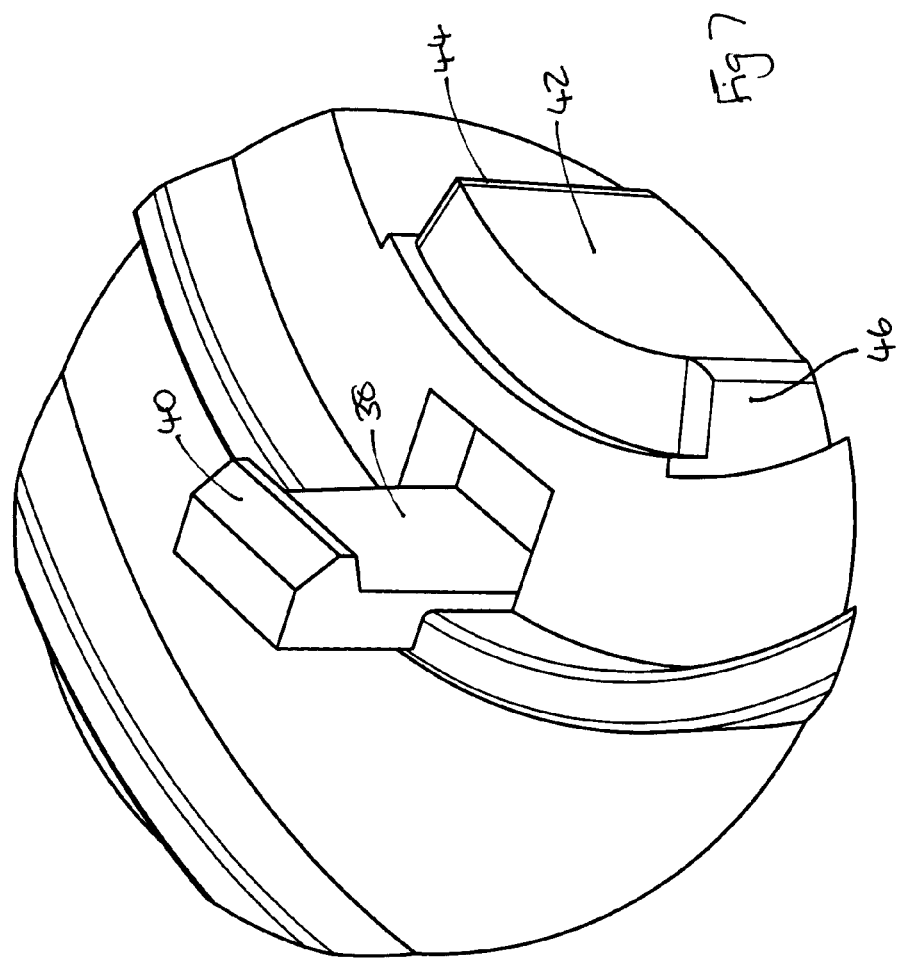

CONTROL ASSEMBLY FOR A ROLLER BLIND

The present invention relates to control assemblies for blinds and in particular to chain driven blind control assemblies for roller blinds.

Blind control assemblies typically include a chain wheel which is driven by an operating chain, such as a ball chain; a drive bush, which in use engages one end of the roller tube and which drives the roller tube to rotate when bush itself is driven to rotate; a clutch to permit the chain wheel to drive the drive bush to rotate, but which prevents the drive bush from rotating the chain wheel (i.e. a one-way drive system); a chain cover element which overlies in use a part of the chain wheel (also known as a chain sprocket or drive sprocket) so as to prevent the operating chain of the blind from jumping out of engagement with the chain wheel; and a locking pin or centre pin which holds the components together in use. Conventionally, chain cover elements are fixed relative to the rotational parts of the blind control assembly. A description of such conventional control assembly is provided in the prior art discussions of GB2392703 in conjunction with FIGS. 1*a-d*, 2*a* and 2*b*.

A conventional chain drive control assembly as discussed above requires it to be dismantled in order to engage the operating chain with the chain wheel of the assembly. However, dismantling the control assembly is time consuming and many blind assemblers try to save time by forcing the operating chain between the chain guard housing and the chain wheel in order to engage the operating chain with the chain wheel without having to dismantle the control assembly. Such actions risk causing damage to the chain wheel, the chain guard housing and/or the operating chain.

GB2392945 proposed a solution to the above-mentioned problems with conventional blind control assemblies in the form of a control assembly in which the chain guard housing is rotatable relative to the sprocket support. Additionally, WO2011/148145 discloses a hinged chain guard housing in which a portion of the chain guard housing can be pivoted to permit access to the chain wheel.

However, the inventors of the present invention propose an alternative arrangement in order to address the problems with known blind control assemblies.

According to a first aspect of the invention, there is provided a control assembly for a roller blind, the assembly including a chain wheel adapted to be driven by an operating chain; a drive bush; and a locking pin, wherein at least one of the chain wheel and drive bush includes a coupling element which in use couples the chain wheel to the drive bush such that axial displacement of the drive bush results in a corresponding axial displacement of the chain wheel, but that relative rotational displacement between the chain wheel and the drive bush is permitted through an arc defined between a pair of opposed stops which are carried by the other of the chain wheel and the drive bush; and wherein the locking pin passes axially through the chain wheel and the drive bush, the locking pin including at one end thereof a pair of opposed legs and at least one leg includes a locking lug adapted to engage a stop surface of the drive bush.

The advantage of this arrangement is that the blind assembler simply needs to displace the drive bush a short distance axially from the remainder of the control assembly components and the chain wheel will be drawn with it by virtue of the coupling between the two components. This then exposes the chain wheel and permits the assembler to engage the operating chain (e.g. a continuous ball chain) with the chain wheel. The coupled components can then be returned to their operational locations relative to the other control assembly components by axial displacement of the drive bush in the opposite direction. This is much quicker and easier than dismantling the entire control assembly, engaging the drive chain with the chain wheel and then re-assembling the control assembly. The locking pin arrangement permits a relatively easy method of withdrawing the drive bush/chain wheel combination from the remainder of the control assembly components. For example, the user simply needs to disengage the or each locking lug from the stop surface of the drive bush (e.g. by pinching the opposed legs together using a finger and thumb) to release the drive bush and coupled chain wheel from the remainder of the assembly.

The opposed legs of the locking pin are suitably resiliently deformable. Furthermore, each leg may include a respective locking lug.

The arc is suitably between 5° and 180°. For example, it may be more than 10°, 20°, 30°, 40°, 50° or 60° and it may be less than 180°, 170°, 160°, 150°, 140°, 130°, 120° or 110°.

In an embodiment of the invention, the coupling element comprises a locking tab carried by one of the drive bush and chain wheel, and the other of the drive bush and chain wheel includes an arcuate slot configured to receive therein the locking tab.

The opposed stops of the arc may be defined by the ends of the arcuate slot formed in the chain wheel or the drive bush. The locking tab may be adapted for location within the arcuate slot in use such that it can rotate within the slot, but is prevented from axial displacement away from or out of the slot. The contact between the locking tab and one end of the arcuate slot may define a first stop and the contact between the tab and the other end of the arcuate slot may define a second, opposed stop.

The locking tab may include a locking element which engages a shoulder portion of the arcuate slot wherein the engagement between the locking element and the shoulder portion prevents axial displacement of the tab from the slot, thereby preventing axial displacement of the drive bush relative to the chain wheel.

The locking pin may include a locking pin end plug which is adapted to be located between the opposed legs in use. The end plug may thereby prevent accidental or unintended release of the blind assembly components by preventing the opposed legs from being urged together and consequently disengaging the or each locking lug from the stop surface of the drive bush. In such an embodiment, a user wishing to access the chain wheel of the control assembly first removes the end plug and then urges together the opposed legs. This disengages the or each locking lug from the stop surface of the drive bush and permits the drive bush and coupled chain wheel to be displaced such that the chain wheel becomes accessible. Suitable end plugs are described in EP1865142, for example.

The locking pin may form part of a chain wheel support component which is adapted (i.e. configured) to support the chain wheel for rotation in use. Alternatively, the locking pin may comprise a separate component. In embodiments in which the locking pin forms a separate component, it may engage at its proximal end (i.e. the end opposite to the opposed legs) a chain wheel support or an end plate of the blind control assembly. In such embodiments the proximal end of the locking pin may include one or more fins. The fins are suitably configured to engage corresponding recesses in the chain wheel support or the end plate to resist rotation of the locking pin relative to the chain wheel support or end plate. The locking pin may further include an additional or alternative rotation preventing element. This may take the form of a flattened portion of the locking pin which corresponds to a complementary flat formed in the aperture provided to receive the locking pin. Examples of locking pins including rotation preventing elements are disclosed in U.S. Pat. No. 7,100,668.

The locking pin may further include an axial stop element which limits its axial displacement towards the drive bush.

In an embodiment of the invention as defined herein, the drive bush includes a flange, located in use adjacent to the chain wheel. One advantage of providing the drive bush with a flange is that is may form or define part of an operating chain channel within which a portion of the operating chain moves in use. A further advantage of providing the drive bush with a flange is that the edge of the fabric of the blind is not rubbed or forced against a stationery surface in use, which may damage the respective edge of the fabric. In a further embodiment, the drive bush includes a substantially cylindrical body and a flange provided at one end thereof, wherein the flange is sloped or curved and is angled away from the body. Thus, the flange may have a convex shape. This arrangement helps to centralise the blind fabric on the roller when the blind is retracted and to minimise any friction between the flange and the fabric in use.

The limited or constrained relative rotation between the chain wheel and the drive bush permits a clutch to be operatively coupled between the two components. In certain known roller blind control assemblies, a clutch is included within the assembly and is arranged to permit the drive bush to be driven by the chain wheel and to prevent the drive bush from driving the chain wheel. In this way, the chain wheel can be used by a user to raise or to lower the blind, but the weight of the blind is prevented from rotating the chain wheel.

The limited or constrained relative rotation allowed between the chain wheel and the drive bush permits the chain wheel to release the clutch, thereby allowing the drive bush to be driven by the rotation of the chain wheel. It also permits the drive bush to engage the clutch, thereby preventing unwanted rotation of the drive bush and chain wheel as a result of the weight of the blind.

Accordingly, in an embodiment of the invention, the control assembly further includes a clutch having a released configuration in which the chain wheel is permitted to drive the drive bush and an engaged configuration in which the drive bush is prevented from rotating.

The clutch may include one or more wrap springs located about a fixed clutch surface. Furthermore, the wrap spring may include one or more contact tangs. The contact tangs may extend longitudinally (i.e. axially) from the main spring body or they may extend radially from the spring body. Thus, the tangs may extend radially inwards from the main body of the spring or they may extend radially outwards from the main body of the spring. Suitably, the contact tangs are radially outwardly projecting tangs. By the term "main body" it is meant the helical arrangement which defines the substantially cylindrical shape of the wrap spring.

The or one of the tangs may be arranged such that a force applied to a first side of the tang releases the clutch and a force applied to a second, opposed side of the tang engages the clutch.

The wrap spring clutch may include a pair of opposed radially projecting tangs which are angularly spaced from each other. For the avoidance of doubt, the term "angularly spaced" means that when the spring is viewed along its central axis, the radially projecting tangs define an angle between them which is greater than 0° and less than 180°.

In an embodiment of the invention, the control assembly includes a wrap spring clutch formed with a radially outwardly projecting tang, wherein the clutch is arranged such that rotation of the chain wheel causes a tang contact portion of the chain wheel to engage a first portion of the tang, thereby releasing the clutch and permitting the chain wheel to drive the drive bush; and wherein attempted rotation of the drive bush other than via the chain wheel causes a tang contact portion of the drive bush to contact a second portion of the tang thereby engaging the clutch.

An operating chain may be included as a component of the control assembly. The operating chain may be a continuous chain, for example a continuous ball chain. For the avoidance of doubt, a ball chain comprises a continuous loop of a flexible element which carries a plurality of spaced apart, fixed ball-like members. Such ball chains are well known in the field of window blinds.

The control assembly may include a chain wheel support which includes a substantially cylindrical body. The body may be adapted to support for rotation (i.e. bear) the chain wheel. It may also provide a fixed friction surface for a clutch (where present). The chain wheel support may also include a flange which acts as an end plate for the control assembly. Furthermore, the flange may carry or define a chain cover element. The chain cover element is suitably arranged to overlie a portion of the chain wheel (and an associated portion of the operating chain). The chain cover element typically functions to prevent disengagement of the operating chain from the chain wheel. When assembling the control assembly, the chain wheel may be axially displaced from the cover element to permit engagement of the operating chain with the chain wheel. The displacement of the chain wheel is achieved by axial displacement of the drive bush, which in turn causes axial displacement of the chain wheel as a result of the coupling between the drive bush and the chain wheel.

In an embodiment of the invention, the drive bush includes a drive bush flange and the assembly further includes a chain wheel support which includes a chain wheel support flange, wherein in use the two flanges are spaced apart to define therebetween an operating chain channel. The drive bush flange and/or the chain wheel support flange further include a chain cover element which in use bridges a portion of the operating chain channel to form an enclosed portion of the channel.

The components of the control assembly are retained together via the locking pin. The locking pin may pass axially though the various components and resist or prevent axial displacement of the two outermost components away from each other. The locking pin suitably includes a pair of opposed, resiliently deformable legs, wherein at least one of the legs carries a locking lug, whereby the pin may be inserted through the components by urging the legs inwards towards each other until the or each locking lug is free of the components. At this point, the legs will spring back outwards and the or each locking lug is able to resist the pin being drawn out of the assembly. The locking pin may subsequently be released by urging together the opposed legs such that the or each locking lug disengages the stop surface of the drive bush.

Suitably, the locking pin is a separate component which in use passes through respective axial apertures formed in the other components of the assembly, such as the chain wheel support, the chain wheel and the drive bush.

The drive bush of the invention is adapted to drive a roller tube. Thus the drive bush may include one or more roller tube engagement elements. These are suitably radially outwardly projecting splines carried by the bush. Thus, the bush may be a splined bush. In use a portion of the bush is located within an open end of the roller tube and the roller tube engagement elements of the drive bush engage with corresponding elements carried by the roller tube. For example, in embodiments in which the drive bush is a splined bush, the portion of the drive bush which carries the splines is located in use within an end of the roller tube where the splines engage inwardly projecting ribs carried by the roller tube. In this way, the drive bush may be axially slid into the roller tube and the roller tube and the drive bush are rotationally locked together as a result of the interengagement of the splines with the ribs.

According to a second aspect of the invention, there is provided a roller blind including a roller tube, an idle end located at one end of the tube and a control assembly as defined in the first aspect of the invention located at the opposite end of the tube.

By the term "idle end", it is meant an end of a roller blind which in use is rotatably coupled to a bracket and which is opposite to the control assembly of the blind. The idle end typically includes an idle end bush adapted to engage one end of a roller tube and forms a bearing/axle arrangement with an idle end bracket which is adapted to allow the idle end of the roller tube to rotate relative to the idle end bracket. Examples of suitable idle end assemblies are defined and described in WO2010/139945, the contents of which are incorporated herein in their entirety by reference.

The roller blind suitably further includes a shading element or elements, which are typically carried by the roller tube. The shading element may be in the form of a sheet, such as in a conventional roller blind, but may alternatively include a shading element typically found in pleated blinds, cellular blinds or Roman blinds, as all of these blinds may be operated via a rotating tube. The shading element may be formed from a woven or non-woven fabric and may be in the form of a laminate of two or more separate sheet elements.

The roller blind of the second aspect may further include a pair of opposed mounting brackets to secure the blind to a fixed substrate, such as a wall or ceiling portion.

Blind components are typically sold by the manufacturers to blind installers, who then take the components to build and install the blinds for the end user. Thus, according to a third aspect of the invention, there is provided a kit of parts for assembling a control assembly, the kit including a chain wheel adapted to be driven by an operating chain; a drive bush; and a locking pin, wherein at least one of the chain wheel and drive bush includes a coupling element which in use couples the chain wheel to the drive bush such that axial displacement of the drive bush results in a corresponding axial displacement of the chain wheel, but that relative rotational displacement between the chain wheel and the drive bush is permitted through an arc defined between a pair of opposed stops which are carried by other of the chain wheel and the drive bush, and wherein the locking pin is adapted to pass axially through the chain wheel and the drive bush, the locking pin including at one end thereof a pair of opposed legs and at least one leg includes a locking lug adapted to engage a stop surface of the drive bush.

The kit of parts may further include a clutch (for example a wrap spring clutch), an operating chain, a chain cover element and/or a chain wheel support.

The chain wheel and the drive bush, together with the clutch, the operating chain, the chain cover element, the chain wheel support, the locking pin and the roller tube where present, may all be as defined hereinabove with reference to the first aspect of the invention.

According to a fourth aspect of the invention, there is provided a kit of parts for assembling a roller blind, wherein the kit includes a roller tube, an idle end assembly and a control assembly kit as defined anywhere herein. The roller tube suitably carries a shading element. The kit may further include a pair of mounting brackets.

The term "roller blind" is intended to cover all blind systems based around a rotating tube. These include conventional roller blinds, but also include blinds such as pleated blinds, cellular blinds and Roman blinds that operate via a rotating tube.

The skilled person will appreciate that the features described and defined in connection with the aspect of the invention and the embodiments thereof may be combined in any combination, regardless of whether the specific combination is expressly mentioned herein. Thus, all such combinations are considered to be made available to the skilled person.

An embodiment of the invention will now be described, by way of example only, with reference to the accompanying drawings in which:

FIGS. 1 and 2 are exploded perspective views of a control assembly according to the invention;

FIG. 3 is a side elevational view of the assembly with the chain wheel exposed;

FIG. 4 is side elevational view of the assembly with the chain wheel covered;

FIG. 5 is a cross sectional view of the assembly with the chain wheel exposed;

FIG. 6 is a cross sectional view of the assembly with the chain wheel covered; and FIG. 7 is a perspective view of the drive bush showing in detail the locking tab.

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

FIGS. 1 and 2 show a control assembly 2 according to the present invention. The control assembly 2 comprises a chain wheel 4, a drive bush 6, a chain wheel support 8 and a locking pin 10.

The chain wheel 4 comprises a substantially cylindrical body 12 having a sprocket 14 located at one end thereof. The sprocket 14 defines a plurality of ball receiving pockets 16 around its circumferential periphery. Each pocket 16 includes a pair of curved upstanding side walls 18 and an end wall 20. The end walls 20 are arranged such that they alternate around the circumference of the sprocket. Thus, for a first pocket 16, the end wall 20 is located at the drive bush end of the pocket (i.e. the left hand side of the pocket 16 as shown in FIG. 1); and for the neighbouring pockets 16 either side of the first pocket 16, the end wall 20 is located at the opposite end of the pocket 16, and so on. This alternating end wall arrangement can be clearly seen in FIGS. 1 and 2.

The chain wheel further defines an arcuate slot 22, which is better seen in FIG. 2. The slot 22 defines an arc of about 100°.

The substantially cylindrical body 12 of the chain wheel 4 includes an axial channel 24 extending from the sprocket 14 to the opposite end of the body 12, which is open. The axial channel 24 is defined by a pair of opposed body portions 26, 28 (body portion 26 being shown in FIG. 1 and body portion 28 being shown in FIG. 2). The opposed body portions 26, 28 form tang contact portions when a wrap spring clutch (not shown) is present in the assembly. Engagement of one of the opposed body portions 26, 28 with the tang of a wrap spring clutch acts to release the clutch and permit rotation of the chain wheel 4 with the drive bush 6.

The drive bush 6 is similar in shape to the chain wheel 4 in the sense that it comprises a substantially cylindrical body 30 having a flange 32 at one end. As can be seen from FIGS. 5 and 6, the flange 32 slopes away from the body 30 and has a curved convex profile. The cylindrical body 30 of the drive bush is shaped and sized to receive therein the cylindrical body 12 of the chain wheel 4 and includes three pairs of radially outwardly projecting splines 34 which are shaped and sized to engage corresponding inwardly projecting ribs formed on a roller tube (not shown).

The flange 32 includes a rearward (i.e. towards the chain wheel) facing lip 36 which extends around the circumference of the flange 32 and a rearward facing locking tab 38, which is shown in more detail in FIG. 7.

The locking tab 38 includes a locking lug 40 at the distal end thereof.

Extending radially inwards from the flange end of the cylindrical body 30 is a clutch contact block 42 including opposed clutch contact surfaces 44 and 46 (also shown in more detail in FIG. 7). The opposed clutch contact surfaces 44, 46 form tang contact portions when a wrap spring clutch (not shown) is present in the assembly. Engagement of one of the opposed clutch contact surfaces 44, 46 with the tang of a wrap spring clutch acts to engage the clutch and to prevent or resist rotation of the drive bush 6. This prevents the weight of the blind acting on the roller tube from rotating the drive bush and causing unwanted movement or deployment of the blind.

The chain wheel support also includes a cylindrical body 48. The cylindrical body 48 of the chain wheel support is sized and shaped to fit within chain wheel 4 and a portion of the cylindrical body 48 supports the chain wheel 4 for rotation. At one end of the cylindrical body 48 is provided a flange 50 which acts as an end plate for the assembly 2. Located around a portion of the periphery of the flange 50 is a chain cover element 52. The chain cover element 52 projects forwards (i.e. towards the drive bush 6) and defines an arcuate cover element which in use lies adjacent to a portion of the sprocket 14, with sufficient spacing between the sprocket 14 and the cover element 52 to allow a correctly operating chain to pass, but which prevents the operating chain from becoming disengaged from the sprocket.

The chain cover element 52 further includes three forward facing alignment tabs 53 which are configured to provide a friction fit with the lip 36 of the drive bush flange 32.

The final component of the assembly 2 as shown in FIG. 1 is the locking pin 10. This is a fairly conventional locking pin and is shown in more detail in FIGS. 5 and 6. The locking pin 10 comprises an elongate body 54 which terminates at one end in a pair of opposed resiliently deformable legs 56, 58. At the distal end of both legs 56, 58 is provided an outwardly extending lug 60, 62. Towards the opposite end of the locking pin 10 is provided a stop surface 64 which engages a portion of the chain wheel support 8 to limit the insertion of the locking pin 10 into the chain wheel support 8.

FIG. 3 shows the control assembly 2 in a closed configuration. It can be seen that the chain cover element 52 is overlies a portion of the chain wheel 4 and is located adjacent to the flange 32 of the drive bush 6. The outwardly extending lugs 60, 62 of the locking pin 10 can also be seen in FIG. 3. The resiliently deformable legs 56, 58 in this arrangement are in their rest position, which causes the lugs 60, 62 to engage a forward facing (i.e. left facing as shown in FIG. 3) surface of the drive bush 6. The forward facing surface of the drive bush defines a stop surface of the drive bush. This arrangement prevents or resists the axial separation of the drive bush 6, the chain wheel 4 and the chain wheel support 8.

FIG. 4 shows the control assembly 2 in an open configuration. In this configuration, the locking pin legs 56, 58 have been deflected inwards (i.e. towards each other) so that the lugs 60, 62 are disengaged from the front face (i.e. the stop surface) of the drive bush 6. This permits the drive bush 6 to be displaced axially away from the chain wheel support 8. As a result of the axial displacement of the drive bush 6, the chain wheel 4 is also displaced away from the chain wheel support 8. This is as a result of the engagement of the locking tab 38 with the arcuate slot 22 (described in more detail below).

As can be seen from FIG. 4, in the open configuration, the chain wheel 4 is fully exposed and is not covered by the chain cover element 52.

FIG. 5 shows a cross sectional view of the control assembly 2 in a closed configuration (i.e. as shown in FIG. 3). It can be seen from this figure the interengagement of the locking tab 38 with the arcuate slot 22 which effectively axially locks the chain wheel 4 to the drive bush 6, but permits relative rotational displacement within the limits defined by the arcuate slot 22. The locking lug 40 engages with a shoulder portion 41 of the sprocket body which defines the arcuate slot 22.

FIG. 5 also shows the friction fit arrangement between the lip 36 of the drive bush flange 32 and the alignment tabs 53 of the chain cover element 52.

FIG. 6 shows a cross sectional view of the control assembly 2 in an open configuration (i.e. as shown in FIG. 4). This shows that the drive bush 6 and the chain wheel 4 are still axially locked together via the interengagement of the locking tab 38 and locking lug 40 with the shoulder portion 41 of the sprocket body which defines the arcuate slot 22.

FIG. 6 also shows the legs 56, 58 inwardly deflected and located within the cylindrical body 30 of the drive bush 6, thus resulting in the disengagement of the lugs 60, 62 from the stop surface defined by the front face of the drive bush 6.

FIG. 7 has been discussed above and shows in more detail the locking tab 38 and its locking lug 40. It also shows the clutch contact block 42.

A control assembly 2 is typically provided to a blind installer, together with an operating chain (not shown) of a pre-determined length. In order for the blind installer to install the chain, he or she simply pinches together the lugs 60, 62 to deflect inwards the legs 56, 58. Once the legs 56, 58 have been deflected sufficiently inwards that the lugs 60, 62 disengage the stop surface of the drive bush 6, the drive bush may be axially displaced away from the chain wheel support 8. As a result of the interengagement of the locking tab 38 with the shoulder portion 41 of the body defining the arcuate slot 22, the axial displacement of the drive bush 6 results in the corresponding axial displacement of the chain wheel 4.

When the control assembly 2 is in an open configuration (as shown in FIGS. 4 and 6), the operating chain can be engaged with the chain wheel 4 such that the balls of the chain which are adjacent to the chain wheel 4 sit within respective pockets 16 defined by the chain wheel 4. The remainder of the operating chain hangs down from the chain wheel 4 in a conventional way.

The control assembly is then closed by displacing the drive bush back towards the chain wheel support 8 until the chain cover element 52 is adjacent to the flange 32 of the drive bush 6 with the alignment tabs 53 contacting the lip 36. In this configuration, the lugs 60, 62 are clear of the drive bush body 30 and the legs 56, 58 are able to spring back to their rest position, thereby securing together the components of the assembly. In this closed configuration, the chain cover element 52 overlies a portion of the chain wheel 4 and the operating chain associated with that portion.

The invention claimed is:

1. A control assembly for a roller blind, the assembly including a chain wheel adapted to be driven about an axis by an operating chain; a chain wheel support configured to rotationally support the chain wheel, the chain wheel support including a chain wheel support flange which carries or defines a chain cover element which in use overlies a portion of the chain wheel; a drive bush mounted for rotation about said axis relative to the chain wheel support; and a locking pin, wherein at least one of the chain wheel and drive bush includes a coupling element which in use couples the chain wheel to the drive bush such that axial displacement of the drive bush results in a corresponding axial displacement of the chain wheel, but that relative rotational displacement between the chain wheel and the drive bush is permitted through an arc defined between a pair of opposed stops which are carried by the other of the chain wheel and the drive bush; and wherein the locking pin passes axially through the chain wheel and the drive bush, the locking pin including at one end thereof a pair of opposed legs and at least one leg includes a locking lug adapted to engage a stop surface of the drive bush; and wherein the drive bush includes a cylindrical body and a drive bush flange, the drive bush flange being spaced from the chain wheel support flange to define therebetween an operating chain channel within which an operating chain is capable of moving; the drive bush flange further including a lip therearound which projects towards the chain wheel support flange, the lip overlying a portion of the chain wheel and contacting the chain cover element of the chain wheel support, the lip and the chain cover element together bridging a portion of the operating chain channel to form an enclosed portion of the operating chain channel; an alignment tab projecting from the chain cover element toward the drive bush flange, wherein the alignment tab is configured and positioned on the chain cover element to frictionally engage with a radially inward surface of the lip; and wherein the drive bush flange is curved away from the drive bush body to define a convex flange surface.

2. A control assembly according to claim 1, wherein the coupling element comprises a locking tab carried by one of the drive bush and chain wheel, and the other of the drive bush and chain wheel includes an arcuate slot configured to receive therein the locking tab.

3. A control assembly according to claim 2, wherein the ends of the arcuate slot define the pair of opposed stops.

4. A control assembly according to claim 1, wherein the opposed legs of the locking pin are resiliently deformable.

5. A control assembly according to claim 1, wherein each leg of the locking pin includes a respective locking lug.

6. A control assembly according to claim 1, wherein the control assembly further includes a clutch having a released configuration in which the chain wheel is permitted to drive the drive bush and an engaged configuration in which the drive bush is prevented from rotating.

7. A control assembly according to claim 6, wherein the clutch is a wrap spring clutch.

8. A control assembly according to claim 1, wherein the locking pin is a separate component which is adapted to pass axially through the chain wheel support, the chain wheel and the drive bush.

9. A control assembly according to claim 1, wherein the drive bush carries one or more roller tube engagement elements.

10. A control assembly according to claim 1, wherein the assembly further includes an operating chain engaged with the chain wheel.

11. A roller blind including a roller tube, an idle end and a control assembly as defined in claim 1.

12. A roller blind according to claim 11, wherein the blind further includes a pair of opposed mounting brackets.

13. A roller blind according to claim 11 wherein the drive bush includes one or more roller tube engagement elements to rotationally lock the drive bush and the roller tube together.

* * * * *